United States Patent [19]
Jeane

[11] 3,829,839
[45] Aug. 13, 1974

[54] PRIORITY INTERRUPT SYSTEM

[75] Inventor: Harvey L. Jeane, Tujunga, Calif.

[73] Assignee: California Institute of Technology, Pasadena, Calif.

[22] Filed: July 24, 1972

[21] Appl. No.: 274,348

[52] U.S. Cl. .................. 340/172.5
[51] Int. Cl. .................. G06f 9/18
[58] Field of Search .................. 340/172.5

[56] References Cited

UNITED STATES PATENTS

| | | | |
|---|---|---|---|
| 3,478,321 | 11/1969 | Cooper et al. | 340/172.5 |
| 3,482,265 | 12/1969 | Cohen et al. | 340/172.5 |
| 3,534,339 | 10/1970 | Rosenblatt | 340/172.5 |
| 3,599,162 | 8/1971 | Byrns et al. | 340/172.5 |
| 3,599,176 | 8/1971 | Cordero, Jr. et al. | 340/172.5 |
| 3,614,740 | 10/1971 | Delagi | 340/172.5 |

*Primary Examiner*—Paul J. Henon
*Assistant Examiner*—John P. Vandenburg
*Attorney, Agent, or Firm*—Lindenberg, Freilich, Wasserman, Rosen & Fernandez

[57] ABSTRACT

A priority interrupt system is disclosed comprising four registers including a push pop register. In the system, designed to accommodate up to *n* interrupts of different priority levels, each of the registers is of *n* bits, with the orders of the bits in the registers corresponding to the priority levels of the different interrupts. The highest order set bit in the push pop register indicates the priority level of the interrupt for which a sub-routine is being executed. Any lower order set bit indicates the priority level of an interrupt for which a sub-routine has been previously started and thereafter interrupted to service a subsequently received interrupt of a higher priority level. The sub-routines are structured so that when a sub-routine is completed the highest order set bit in the push pop register is reset and the controlled computer automatically returns to complete the sub-routine associated with the next highest order set bit in the push pop register. The other registers are used to receive the various interrupts, to compare the highest priority level of any of them with the highest order set bit in the push pop register to determine whether or not the computer's operation should be interrupted.

10 Claims, 15 Drawing Figures

PRIORITY INTERRUPT SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention is generally directed to a computer interrupt system and, more particularly, to a priority interrupt system.

2. Description of the Prior Art

In advanced computer systems various channels or sources are capable of accessing the same computer. If the sources are of different degrees of importance, generally thought of as being of different priority orders or levels, it is important to control the computer to service the sources in accordance with their priority levels. That is, it is important to control the computer so that if a request for service is received by the computer system from a source of a given priority level while the computer services a source of a lower priority level, the computer's operation is interrupted to first service the source with the highest priority level. The servicing of each source is generally performed by executing a particular sub-routine associated with its priority level.

Herebefore various priority interrupt systems have been designed. However, due to the complexity of the functions which they are required to perform all prior art systems are very complex, and therefore quite expensive. Also their complexity subjects them to frequent breakdowns, and therefore they require frequent maintenance. In addition, all prior art systems require a considerable amount of software in the computer's programs. The software is necessary for the elaborate and complicated housekeeping chores which the computer must perform when its operation is interrupted repeatedly in order to service the source of the highest priority level, yet be able to return to the previously partially executed operation once the service for the source of the highest priority level is completed. Since computer time is very expensive the execution of lengthy time-consuming housekeeping chores is most undesirable.

A need therefore exists for a new priority interrupt system which does not suffer from the disadvantages characterizing the prior art systems. Basically, a need exists for a priority interrupt system comprising of a minimum amount of hardware and one which is capable of operating with a computer in a manner which minimizes the amount of software needed for the execution of all housekeeping chores related to the interruptions of the computer's operation.

OBJECTS AND SUMMARY OF THE INVENTION

It is a primary object of the present invention to provide a new improved priority interrupt system.

Another object of the present invention is to provide a new priority interrupt system with a minimum amount of hardware.

A further object of the present invention is to provide a new priority interrupt system which minimizes the amount of software needed to control the housekeeping chores in a computer in which sub-routine execution is interruptable to enable the computer to service different sources in the order of their priority levels.

These and other objects of the invention are achieved by providing a priority interrupt system with hardware including a register, hereafter referred to as a push pop register. At any time, the push pop register indicates in hardware, rather than software terms, the priority level of the source which the computer is currently servicing as well as the priority levels of other sources of lower priority levels for which partial service was performed by the computer but was interrupted when requests from sources of higher priority levels were received. The indication is provided by the setting of bits in the push pop registers which correspond to different priority levels.

The priority interrupt system, in addition to the push pop register, includes several additional registers, including a line register. Its bits which correspond to the various priority levels are set when interrupt requests are received from sources of priority levels corresponding to the order of the bits in the register. The states of the bits in the line register are transferred to the bits of a primary register. If in the primary register a set bit is found, which has an order higher than the order of the highest order set bit in the push pop register an interrupt request is sent to the computer. Generally, it is used to interrupt the computer operation and cause it to perform the sub-routine associated with the highest order set bit in the primary register. Each sub-routine in the computer includes instructions which greatly simplify the computer's housekeeping chores.

The novel features of the invention are set forth with particularity in the appended claims. The invention will best be understood from the following description when read in conjunction with the accompanying drawings.

DETAILED DESCRIPTION OF THE PREFERRED EMBODIMENTS

Figure 1:
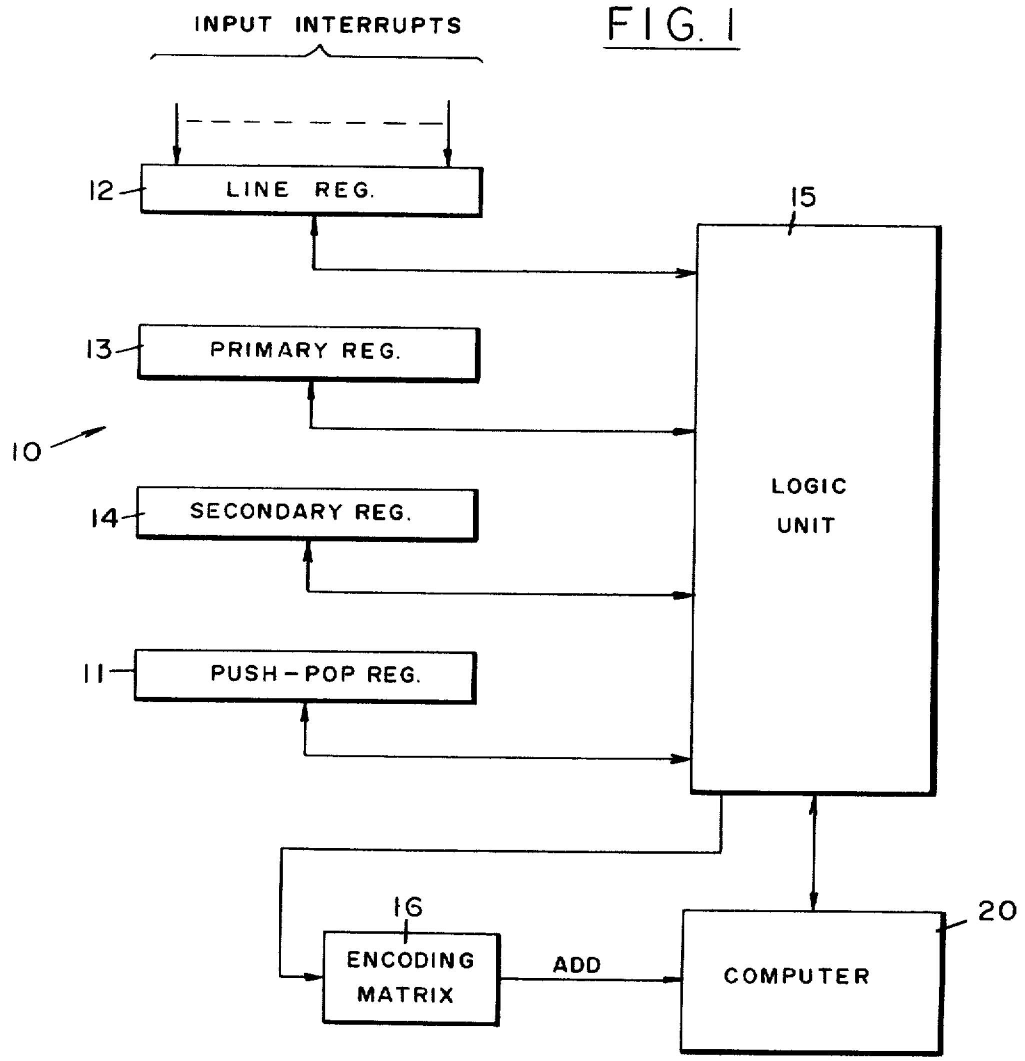
FIG. 1 is a general block diagram of the novel priority interrupt system of the present invention.

The present invention will be described in connection with a system designed to handle interrupt requests of different priority orders or levels, which for explanatory purposes are limited to 10. The interrupts will be referred to hereafter in accordance with their priority levels. Thus, interrupt 0 refers to an interrupt of the lowest priority level, while interrupt 9 refers to an interrupt of the highest priority level. As seen in FIG. 1, the present system 10 includes four registers, designated as a push pop (PP) register 11, a line register 12, a primary register 13 and a secondary register 14. Each of the four registers is 10 bits long, with corresponding bits in the four registers being associated with different priority levels. Thus, the 0 bits in the four registers are associated with interrupt 0, the 1 bits in the four registers being associated with interrupt 1, etc. The four registers are connected by logic circuitry, represented by logic unit 15 to a computer 20.

In computer 20, which the present system 10 is designed to control, an interrupt sub-routine is stored for each one of the 10 different interrupts. The function of the system 10 is to control the computer to execute the various interrupt sub-routines in accordance with the received interrupts and in particular in accordance with their priority levels. If an interrupt is received while the computer executes a main routine, the system 10 controls the computer to interrupt the main routine and execute the sub-routine for the particular interrupt. If an interrupt of a higher priority level is not received during the execution of the interrupt sub-routine, the sub-routine is completed and thereafter the computer returns to further execute the main routine. If, however, while executing a sub-routine for an interrupt, an interrupt of a higher priority level is received the interrupt sub-routine being executed is interrupted and the sub-routine of the higher priority level interrupt is executed. Then, when the latter is completed, the computer automatically returns to complete the sub-routine of the lower priority level interrupt before returning to complete the main routine.

Basic to the operation of the present invention is the push pop register 11. Therein, the highest order bit which is in a set state or simply set indicates the priority level of the interrupt for which a sub-routine is being executed by the computer. If more than one bit are set in the push pop register 11 the set bits of orders lower than the highest order set bit indicate sub-routines associated with interrupts of priority levels corresponding to those set bits in the push pop register which have been previously partially executed and interrupted in order to execute sub-routines associated with higher order interrupts. For example, if bit 5 in the push pop register is the highest set bit, it indicates that the computer 20 is executing a sub-routine associated with interrupt 5, i.e., with the interrupt of priority level 5. If, however, in addition to bit 5, bits 3 and 1 are set in the push pop register, in addition to indicating that the computer is executing the sub-routine associated with interrupt 5, it further indicates that the sub-routines associated with interrupts 3 and 1 have been previously partially executed and thereafter interrupted in order to execute the sub-routine associated with the higher order level interrupt 5. Thus, the states of the various bits in the push pop register indicate the present sub-routine being executed by the computer, if any, as well as previously partially executed sub-routines.

In the last described situation, when the computer completes the sub-routine associated with interrupt 5 it automatically resets the highest order set bit in the push pop register, i.e., bit 5, so that thereafter bit 3 is the highest order set bit in the push pop register. Also, after resetting the highest order set bit in the push pop register the computer automatically returns to complete the execution of the sub-routine associated with interrupt 3. If while executing this sub-routine no interrupt of priority level higher than 3 is received, after the completion of the sub-routine, associated with interrupt 3, bit 3 in the push pop register is reset by the computer. Consequently, only bit 1 remains set in the push pop register and the computer automatically proceeds to complete the execution of the sub-routine associated with interrupt 1.

If, however, while bits 5, 3 and 1 are set in the push pop register and the computer at this time is executing the sub-routine associated with interrupt 5 an interrupt of a priority level higher than 5 is received, e.g., interrupt 7, the computer is requested to interrupt the sub-routine presently being executed, i.e., sub-routine 5. When the interrupt request is acknowledged by the computer the system 10 provides the computer with an address, which as will be described thereafter is used to locate the top address of sub-routine 7. The computer locates the address to execute this sub-routine. However, before proceeding to do so its sets bit 7 in the push pop register 11 to indicate that the sub-routine which is to be executed is one associated with interrupt 7.

While the push pop register 11 provides a hardware indication of the interrupt priority level for which a sub-routine is being executed, as well as the interrupt priority levels for which sub-routines have been previously partially executed, the line register, the primary and secondary registers are used, in a manner to be described hereafter in detail, to receive the various interrupts, determine which of the received interrupts is of the highest priority level and further determine whether its priority level is higher than the interrupt level for which a sub-routine is being presently executed.

The function of the line register 12 is to receive the various interrupts which set corresponding bits in register 12. For example, bit 4 is set when interrupt 4 is received. The bit remains set until the computer is requested to perform the sub-routine 4. At fixed intervals, e.g., each 900 ns the content of register 12 is transferred to primary register 13. In this example bit 4 of primary register 13 is set. Then an interrupt request is sent to the computer only if the highest order set bit in the primary register 13 is of an order which is higher than the highest order set bit in the push pop register 11. Assuming that in the latter, none of the bits is set, since bit 4 is set in the primary register 13 an interrupt request is sent to the computer.

The computer operates asynchrously. Thus, it responds to the interrupt request only when it is ready to do so. It responds to the request by defining a request acknowledge period during which an input line to unit 15 is high and a complementary line is low. At the start of the period, the highest order set bit in line register 12 i.e., bit 4 is reset. Also since bit 4 is the highest set bit in the primary register 13 bit 4 in the secondary register 14 is set. When bit 4 is set in register 14 an encoding matrix 16 is activated. It generates an address corresponding to bit 4. Thereat a JUMP and MARK instruction is generally located. Basically, it instructs the computer to jump to the top address of sub-routine 4 and mark therein the address at which the computer's operation was interrupted. When a JUMP and MARK instruction is found since bit 4 is set in register 14, bit 4 is set in the push pop register 11. After the JUMP and MARK instruction is performed the interrupt acknowledge period comes to an end at which time bit 4 in register 14 is reset. Thus, while bit 4 in the push pop register 11 is set the computer executes sub-routine 4.

The foregoing description may be summarized in connection with FIGS. 2A through 2L. Let it be assumed that at some time the computer is executing sub-routine 4. Consequently, bit 4 in push pop register 11 is set as shown by the + sign in FIG. 2A. Let it further be assumed that at some subsequent time interrupts 1 and 6 are received. Consequently, bits 1 and 6 are set in line register 12, and during the transfer time corresponding bits 1 and 6 are set in primary register 13 as shown in 2B. Since set bit 6 in register 13 is of a higher order than the highest set bit 4 in register 11 an interrupt request is sent to the computer. When the latter acknowledges the request it establishes the interrupt acknowledge period. At the start of this period the bit in secondary register 14 corresponding to the highest set bit in register 13, i.e., bit 6 is set (see FIGS. 2C). The corresponding bit 6 in line register 11 is reset. Also, no transfer from the line register to the primary register is permitted to occur during this period.

Figures 2A, 2B, 2C, 2D, 2E, 2F, 2G, 2H, 2I, 2J, 2K, 2L:
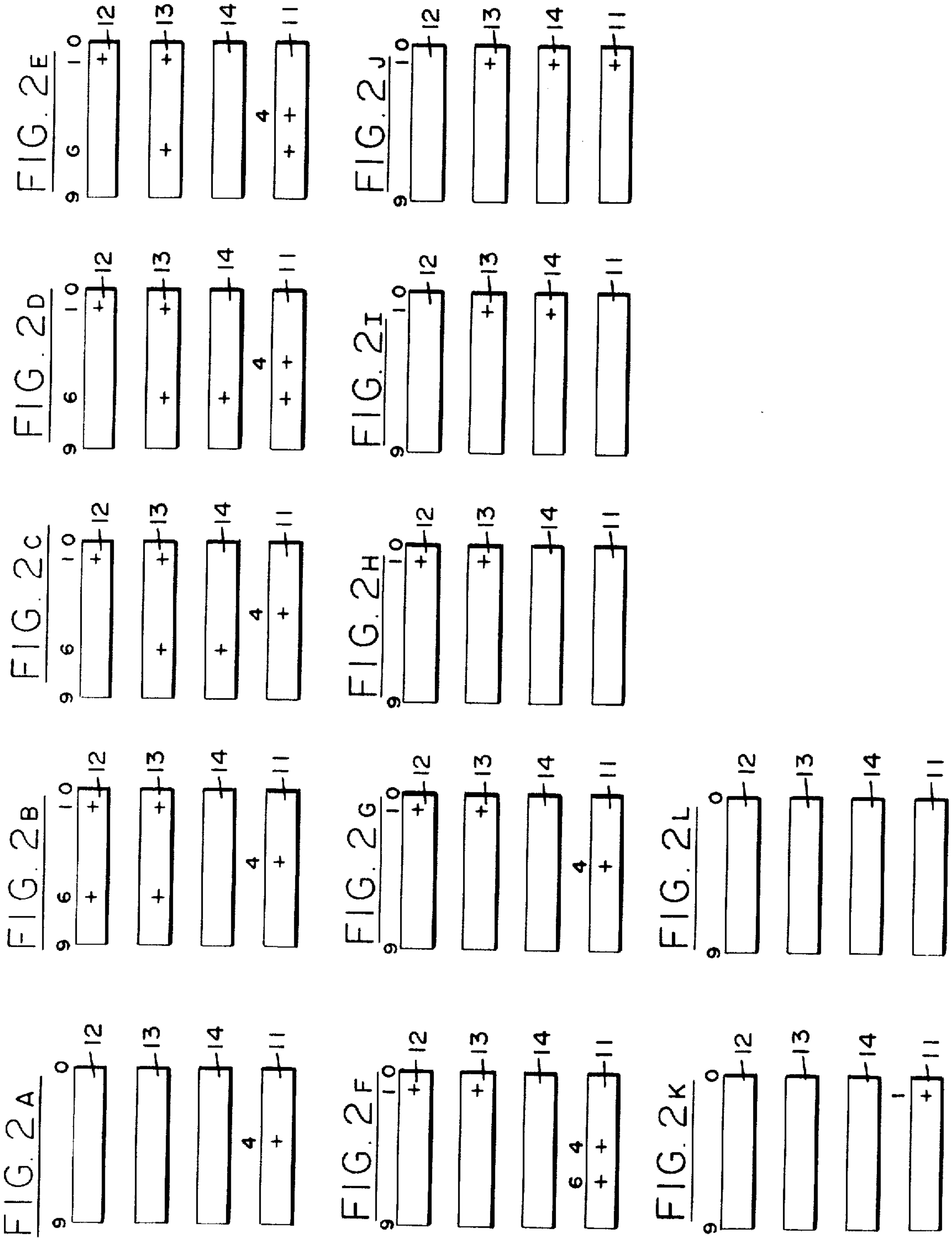

When bit 6 in secondary register 14 is set it activates the encoding matrix 16 to generate a specific address. Assuming that a JUMP and MARK instruction is located thereat the computer jumps to the top address of sub-routine 6 and stores therein the address at which sub-routine 4 was interrupted. The computer also supplies a signal indicating a JUMP and MARK instruction to logic unit 15. It causes the bit in register 11 corresponding to the set bit in register 14, i.e., bit 6 to be set, as shown in FIG. 2D. Then at the end of the acknowledge period the set bit 6 in secondary register 14 is reset. See FIG. 2E. Also, after this period transfers between line register 12 and primary register 13 are permitted to occur. When the first transfer occurs as shown in FIG. 2F, only bit 1 is set in primary register 13. However, since set bit 1 is of a lower order than the highest order set bit 6 in push pop register 11 no interrupt request is produced. Thus, the computer proceeds to execute sub-routine 6 for the highest order interrupt which was received.

In accordance with the present invention, each sub-routine includes two specific instructions in its last two addresses. In the address before the last an EXIT command instruction is located. It commands the computer to supply an EXIT command signal hereafter designated EXC 040 to system 10. As a result the highest order set bit in register 11, which is bit 6 in the present example, is reset (see FIG. 2G). In the last address a JUMP INDIRECTLY instruction is located. Thus, the computer jumps to the top address of the sub-routine and retrieves therefrom the address at which it was operating before the last interrupt request was received. In the present example, it was an address in sub-routine 4. Thus, the computer proceeds to complete sub-routine 4. It should be stressed that this state of operation is automatically indicated by bit 4 of the push pop register 11 being the highest set bit.

When sub-routine 4 is completed bit 4 in register 11 is reset (see FIG. 2H). Thus, all the bits in register 11 are in a reset state. Consequently, when set bit 1 of line register 12 is transferred to set bit 1 in register 13 an interrupt request is produced since bit 1 in register 13 is of a higher order than the highest set bit in register 11 (see FIG. 2I).

At the start of the next acknowledge period bit 1 in line register 12 is reset and bit 1 in secondary register 14 is set. It causes an address to be generated wherein a JUMP to address of the top of sub-routine 1 is located and MARK instruction is located. An address in the main routine at which the computer was interrupted is stored therein. Also, the computer provides system 10 with the JUMP and MARK signal setting bit 1 in push pop register 11 (FIG. 2J). Then at the end of the acknowledge period bit 1 in the secondary register 14 is reset. During the next transfer since all the bits in the line register 12 are reset all bits in the primary register 13 are reset (see FIG. 2K). Finally, when sub-routine 1 is completed bit 1 in push pop register 11 is reset (see FIG. 2L), and since no new interrupts have been received the computer is free to resume the execution of the main routine.

Figure 3:
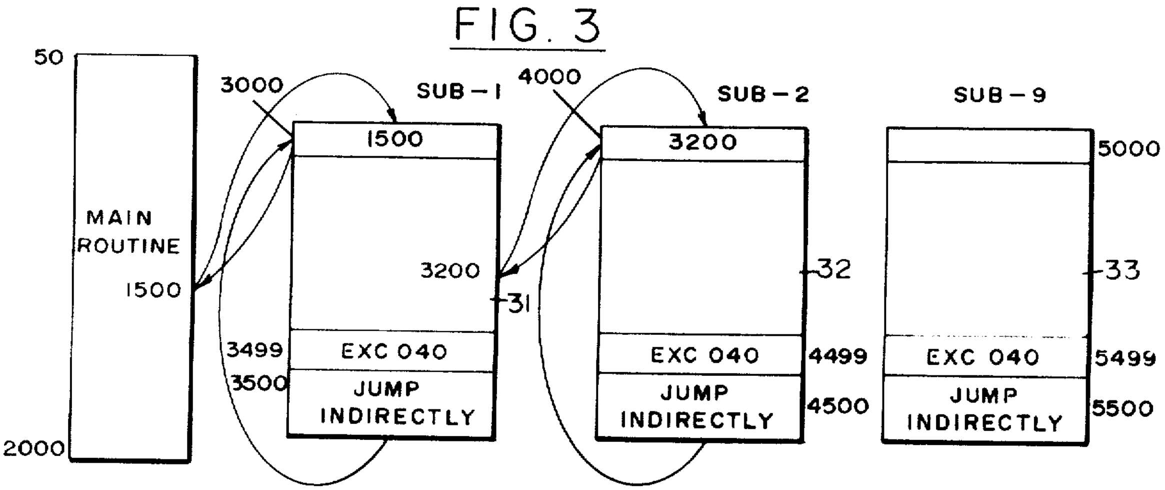
FIGS. 2A-2L and FIG. 3 are diagrams useful in explaining the operations of the priority interrupt system and the computer controlled thereby.

The manner in which the computer interrupts the main routine or a sub-routine to execute a sub-routine for an interrupt of a higher priority level may best be explained in connection with FIG. 3. Therein block 30 designates a main routine at addresses 50 through 2,000, and blocks 31, 32 and 33 designate sub-routines 1, 5 and 9 for interrupts 1, 5 and 9, respectively. Sub-routine 1 is at addresses 3,000–3,500, sub-routine 5 at addresses 4,000–4,500, and sub-routine 9 at addresses 5,000–5,500.

Let it be assumed that the computer executes the main routine at address 1,500 when an interrupt request is acknowledged in response to the reception of interrupt 1. Bit 1 of secondary register 14 causes the encoding matrix 15 to generate a fixed address in which a JUMP to address 3,000 which is the top address of sub-routine 1 and MARK instruction is located. The computer thus JUMPS to address 3,000 and stores therein address 1,500. As herebefore explained bit 1 of the push pop register 11 is also set. If no interrupt of an order higher than order 1 is received, the computer completes sub-routine 1. At address 3,499, the address before the last of sub-routine 1, an EXIT command instruction EXC 040 is located. As a result, the computer provides the EXC 040 signal causing bit 1 in the push pop register 11 to be reset. Then at the last address 3,500 a JUMP INDIRECTLY instruction is located. As a result the computer jumps indirectly to top address 3,000 and retrieves therefrom address 1,500 to resume the main routine.

If however, an interrupt of priority level higher than 1, is received during the execution of sub-routine 1, the latter is interrupted when an interrupt request is acknowledged. Assuming the higher priority interrupt is of order 5, when bit 5 in secondary register 14 is set it generates a specific address wherein JUMP to 4,000 and MARK instruction is located. Thus, the computer jumps to address 4,000 and stores therein the address at which sub-routine 1 was interrupted, e.g., 3,200. Then, bit 5 in push pop register is set. Also, bit 5 in register 14 is reset and sub-routine 5 is executed. When completing it, the EXC 040 signal is received by system 10 to reset bit 5 in register 11 and thereafter the computer jumps indirectly to address 4,000 to retrieve address 3,200 at which the execution of sub-routine 1 is now continued.

Herebefore, it was assumed that each set bit in secondary register 14 causes the encoding matrix to generate a different specific address wherein is located a JUMP and MARK instruction to the top address of the particular sub-routine associated with the particular set bit. Such an arrangement is most convenient since it provides programming flexibility and the ability to change the lengths of the different sub-routines and particularly to change the locations of their top addresses without having to change the locations of the specific addresses generated by matrix 16.

From the foregoing, it is thus seen that a minimum of hardware and software is needed to control the servicing of interrupts of different priority levels and the housekeeping chores needed to locate and perform the sub-routines associated with the received interrupt of highest priority, yet be able to return and complete subroutines associated with received interrupts of lower priority levels which have been partially executed and interrupted to accommodate the execution of subroutines for higher priority interrupts.

Figure 4:
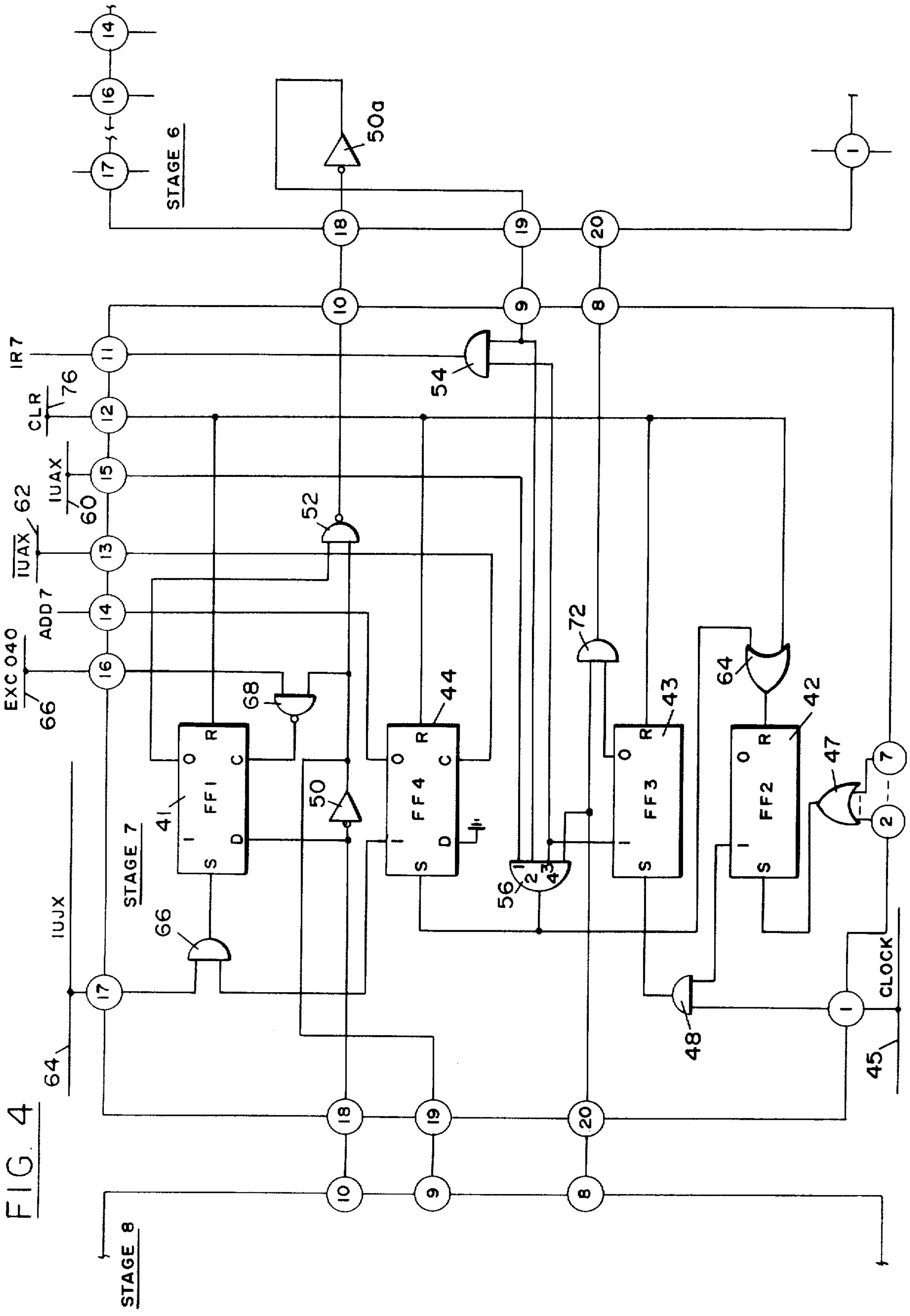
FIG. 4 is a logic diagram of one stage of the novel priority interrupt system.

From the foregoing description it should be appreciated by those familiar with the art, that system 10 may be implemented with different logic design techniques. Thus, the following description of an embodiment, actually reduced to practice, should be viewed as an example of the invention rather than limiting the invention thereto. FIG. 4 to which reference is now made, is a logic diagram of a single stage of system 10. In any implementation, the number of stages which are connected in sequence depends on the number of different priority levels of the interrupts which the system is designed to accommodate. For a priority interrupt system, such as that shown in block form in FIG. 1, 10 stages are employed. For explanatory purposes, the stage shown in FIG. 4 is assumed to represent the one associated with bits 7 in the various registers. For the particular example, stages 9 and 8 associated with bits 9 and 8 precede stage 7, while seven additional stages associated with bits 6 through 0 follow stage 7.

Stage 7 includes the bit 7 of each of the four registers, as well as, all of the logic circuitry necessary to control the system to operate as hereinbefore described. In FIG. 4, numerals 41 through 44 designate four flip flops FF1 through FF4, respectively. FF1 represents bit 7 of the push pop register 11, FF2 represents bit 7 of the line register 12, FF3 represents bit 7 of the primary register 13 and FF4 represents bit 7 of the line register 14.

The stage 7 is shown to have 20 different main terminals designated by the numerals 1 through 20, each surrounded by a circle. Main terminal 1 is connected to a clock line 45. In operation the transfer of the state of any bit in the line register 12 to the corresponding bit in the primary register 13 occurs when a clock pulse is applied to line 45. Main terminals 2 through 7 are designed to receive interrupts of priority level 7 from different sources, which in practice include external hardware sources as well as software instructions from the computer 20. Thus, the computer itself can request an interrupt to occur. Main terminal 8 of stage 7 is connected to main terminal 20 of the succeeding stage 6, while the main terminal 20 of stage 7 is connected to main terminal 8 of the preceding stage 8. Similarly, main terminals 9 and 10 of stage 7 are connected to main terminals 19 and 18 of the succeeding stage 6 while main terminals 18 and 19 of stage 7 are connected to the main terminals 10 and 9 respectively of the preceding stage 8.

Main terminal 11 is used to provide an interrupt request signal whenever bit 7, i.e., FF3 in the primary register 13 is set and none of the bits of the push pop register of the same i.e., 7 or higher orders (8 and 9) are set. Main terminal 12 is used to receive a clear signal which is used to reset all the flip flops. Main terminal 14 is used to supply a control signal ADD 7 to the encoding matrix 16 to generate an address corresponding to priority level 7 whenever the bit 7, i.e., FF4 in the secondary register 14 is set, as will be described hereafter. Finally, main terminals 13, and 15 through 17 are designed to receive various control signals from the computer in order to control the operation of the stage to perform the functions hereinbefore described.

Before proceeding to describe stage 7, two additional points need be made. In operation, main terminal 20 is at a logic 1 or high whenever none of the higher order bits (8 and 9) in the primary register 13 is set. Also, main terminal 18 is at a logic 0 or low whenever none of the higher order bits (8 and 9) in the push pop register 11 is set. In operation whenever an interrupt 7 is received from any of the sources capable of providing such interrupts at any one of terminals 2 through 7 OR gate 47 is enabled, providing an output which directly sets FF2, which represents bit 7 of the line register 12. When flip flop FF2 is set, its one output is true. Consequently, when a clock pulse is applied to line 45 during the transfer instant an AND gate 48 is enabled. Its true output directly sets FF3, which is bit 7 in the primary register 13.

As is appreciated by those familiar with the art when a flip flop is set its one (1) output is true or high and its zero (0) output is false or low. As previously explained, when a bit in the primary register 13 is set an interrupt request is produced only if none of the bits in the push pop register of the same or higher orders is set. Thus, in the present examle assuming that FF3 which is bit 7 in the primary register 13 is set an interrupt request will be produced at terminal 11 only if bits 7 through 9 in the push pop register are not set. Assuming that bits 8 and 9 in the push pop register are not set the level at the main terminal 18 is a logic zero or low. Therefore the output of an inverter 50 is high. As shown in FIG. 4, the output of inverter 50 is supplied to the main terminal 19, which through main terminal 9 of stage 8 is supplied back to stage 8. It is also supplied to a NAND gate 52. Assuming that in addition to bits 8 and 9 in the push pop register bit 7, i.e., FF1 is not set. Consequently its 0 output is high, and therefore, the output of gate 52 to main terminal 10 is low. Since this output is supplied through main terminal 18 of the succeeding stage 6 which includes an inverter 50*a*, similar to inverter 50, the output of the former is high. Consequently, the level at main terminal 19 of stage 6, as well as at terminal 9 of stage 7, is high.

As seen, terminal 9 is connected to one input of AND gate 54, the other input of which is connected to the one output of bit 7, i.e., FF3 of primary register 13. Consequently, when this bit is set and bits 7 through 9 of the push pop register 11 are not set both inputs to gate 54 are high. Therefore, it provides a high output to main terminal 11. The high output at main terminal 11 causes an interrupt request to be produced. In practice all the main terminals 11 of the various stages 10 in the present example, are OR-ed together so that if a high level is present at any one of terminals 11 an interrupt request is sent to the computer.

As previously pointed out, the computer operates asynchrously. Consequently, it can not respond immediately to the interrupt request. However, when the computer is ready to acknowledge the interrupt request it defines an interrupt acknowledge period, e.g., 3 microseconds, during which the computer coacts with the priority interrupt system to service the particular interrupt of highest priority level requiring servicing. Furthermore, as previously pointed out at the start of the interrupt acknowledge period two events take place. These include the setting of a bit in the secondary register 14 corresponding to the highest set bit in the primary register 13 and the resetting of the highest order set bit in the line register.

For explanatory purposes, let it be assumed that bits 8 and 9 in the primary register are not set. Consequently, main terminal 20 is at a logic 1 or high and therefore input 4 of a AND gate 56 is high. Similarly, assuming that FF3, which is bit 7 in the primary register is set input 3 of the same gate is also high. Let it further be assumed that none of the bits 7 through 9 of the push pop register 11 is set. Consequently, from the foregoing it should be appreciated that main terminal 9, which in addition to being connected to AND gate 54 is also connected to input 2 of gate 56 is high. One input of AND gate 56 is connected to main terminal 15 which is connected to a line 60. This line designated IUAX, is set to a logic 1 or high during the entire interrupt acknowledge period. Similarly, line 62 which is connected to main terminal 13 is its complement, i.e., it is set to a logic 0 or low during the interrupt acknowledge period.

As soon as the interrupt acknowledge period is established, the input 1 to AND gate 56 is high. Since in the present example, the other three inputs are also high the output of AND gate 56 is high. When this happens bit 7, i.e., FF4 in the secondary register 14 is directly set and bit 7 in the primary register 12 is directly reset through an OR gate 64. As soon as FF4 (bit 7 of the secondary register 14) is set its 0 output changes from a logic 1 to a logic 0, or from high to low. This transition in level at main terminal 14 which is connected to the 0 output of FF4, activates the encoding matrix 16 and causes it to generate a specific address which in FIG. 4 is designated ADD 7. Thus, the encoding matrix generates the specific address for bit 7.

At this address the computer generally locates a JUMP and MARK instruction. Consequently, the computer jumps to the top address associated with subroutine 7 and marks therein the address at which the previous operation of the computer was interrupted. When the JUMP and MARK instruction is located the computer provides a JUMP and MARK control signal (IUJX) on line 64 which is connected to main terminal 17, thereby enabling a AND gate 66 which is connected to the one output of FF4, which is bit 7 of the secondary register 14. Consequently since bit 7 of the secondary register is set a direct set signal is applied via AND gate 66 to bit 7 of the push pop register 11, i.e., FF1 which is set.

At the end of the interrupt acknowledge period line 62 changes from a logic 0 to a logic 1. Consequently, a clocking pulse is supplied to bit 7 of the secondary register 14, i.e., to FF4. Since its data (D) terminal is grounded, as shown, FF4, i.e., bit 7 of the secondary register 14 is reset.

Thereafter the computer proceeds to execute the sub-routine associated with interrupt 7. As previously explained, the instruction before the last is one designed to reset the highest order set bit in the push pop register 11. This instruction causes the EXC 040 signal to be applied to line 66 which is connected to main terminal 16. If bit 7 of the push pop register 11 is the highest set bit, the main terminal 18 of stage 7 is at a logic 0 or low. Consequently the input of FF1 is low. Also, the output of the inverter 50 which is supplied to a NAND gate 68 is high. When the EXC 040 signal is applied both inputs to the NAND gate 68 are high. Consequently, a low clock pulse is supplied to FF1, and since its D input is low, FF1, i.e., bit 7 of the push pop register 11 is reset.

It should be pointed out, that if bit 8 for example, of the push pop register 11 were set, main terminal 18 would be at a high level and consequently the output of the inverter 50 would be low and thereby prevent the clocking of FF1, i.e., bit 7 of the push pop register 11 from being affected when the EXC 040 signal is applied to all the terminals 16 of the various stages.

In addition to the foregoing described logic circuits, stage 7 further includes a AND gate 72 and an inverter 74. As previously pointed out main terminal 20 is at a logic 1 or high if neither bits 8 or 9 in the primary register is set. Consequently, if FF3, which is bit 7 of the primary register, is also in a reset state, both inputs to AND gate 72 are high, and consequently it provides a high output. As a result, the level at the main terminal 8 as well as main terminal 20 of the succeeding stage 6 is high. However, if bits 8 and 9 of the primary register 13 are reset and FF3, which is bit 7 of the primary register, is set one of the inputs to AND gate 72 from the 0 output of FF3 is low. Consequently, the output of AND gate 72 is low and therefore terminals 8 and 20 of stages 7 and 6, respectively are low. In addition to the foregoing, the direct reset terminals of flip flops 1, 3 and 4 are directly connected to main terminal 12, while the direct reset terminal of FF2 is connected to main terminal 12 through OR gate 64. Terminal 12 is connected to a clear (CLR) line 76 on which a clear pulse is applied whenever the four flip flops are to be reset.

From the foregoing, it is thus seen that stage 7 includes the four flip flops which represent corresponding bits 7 in the four register as well as additional simple logic elements such as OR gates, AND gates and inverters, which together control the stage as hereinbefore described. As previously pointed out the number of stages, generally referred to as *n*, depends on the number of different priority levels of interrupts which the system is designed to control. It should be further pointed out that in terms of hardware the *n* stages represent a minimum of hardware necessary to control the complex functions of servicing interrupts of different priority levels and control a computer. The computer is controlled so that whenever an interrupt of a given priority level is received if the computer is in the process of performing a main routine or a sub-routine associated with an interrupt of a lower priority level the operation of the computer is interrupted to enable it to service the interrupt of the higher priority level by performing the sub-routine associated therewith.

It should be further pointed out that the amount of software needed to execute all the housekeeping chores in connection with performance of sub-routines and interruption of operations of the computer is minimal in accordance with the present invention. Basically, by incorporating the JUMP and MARK instruction technique any main routine or sub-routine may be easily interrupted by generating the address associated with the sub-routine of an interrupt of a higher priority level and store, at the top address of such sub-routine, the address at which the program was previously interrupted. Thereafter, before exiting the sub-routine the highest order bit which is set in the push pop register is reset and the last instruction of the sub-routine is used to JUMP indirectly through the top address of the sub-routine to the address at which the computer operation was previously interrupted.

All of these basic advantages of the present invention are accomplished by incorporating the push pop register and operating in the manner hereinbefore described. That is, the push pop register indicates the priority level associated with the sub-routine actually being executed, which is represented by the highest order set bit in the push pop register. The latter also indicated any previously partially executed one or more sub-routines associated with interrupts of lower priority levels. Whenever a sub-routine is completed the highest order set bit in the push pop register is reset so that thereafter any lower order set bit in the register automatically indicates the sub-routine to which the computer returns. Consequently, the computer does not have to be interrogated to determine the routine for which interrupt is being executed. Rather, it is the state or states of the bits in the push pop register, which forms an integral and most significant part of the system of the present invention, that are used for such purpose. When an interrupt or interrupts are transferred from the line register to the primary register, it is the states of the bits in the push pop register which are interrogated to determine whether any of the last received interrupts has a priority level which is higher than the level of the interrupt for which a sub-routine is currently being executed. If it is not, the computer is not interrupted by inhibiting an interrupt request from being produced. On the other hand, if any of the last received interrupts is of a priority level which is higher than that of the interrupt for which a sub-routine is currently being executed, the system automatically provides the interrupt request. Then when the computer is in a condition to acknowledge it, it is provided with an address which is related to the interrupt of the highest priority level for which the computer is requested to perform the sub-routine, while interrupting the sub-routine of a lower priority level interrupt.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a priority interrupt system of the type adapted to receive interrupt requests of n different priority levels to control a computer to execute sub-routines associated with said interrupt requests in order of their priority levels an arrangement comprising:

first means for receiving each of said interrupt requests and for holding it until it is acknowledged by said computer; and second means coupled to said first means and to said computer for providing an indication of the priority level of the interrupt request for which a sub-routine is being executed by said computer and the priority levels of any other interrupts for which sub-routines were partially executed by said computer, said second means including a first register of n successive bits, each bit corresponding to a different one of said n different priority levels, with the highest order set bit in said first register indicating the priority level of the interrupt request for which a sub-routine is being executed by said computer and any lower order set bit in said first register indicating a partially executed sub-routine for an interrupt request of one of said priority levels which was interrupted to execute a sub-routine for an interrupt request of a higher priority level, n being an integer greater than one.

2. In a priority interrupt system as described in claim 1 wherein said second means include control means for resetting the highest order set bit in said first register upon the completion of a sub-routine by said computer.

3. In a priority interrupt system as described in claim 2 wherein said first means includes means for supplying an interrupt request signal to said computer only when an interrupt request is received having a priority level which is not less than the priority level corresponding to the highest order set bit in said first register.

4. In a priority interrupt system as described in claim 3 wherein said first means include means responsive to an interrupt-acknowledge signal provided by said computer in response to said interrupt request for providing said computer with an address corresponding to the highest priority level of any of the interrupt requests received by said system.

5. A priority interrupt system for use with a computer adapted to execute a different sub-routine for each of n interrupt requests of different priority levels comprising:

a plurality of registers each including $n$ bits arranged in an ordered sequence, with the $k$th bit of each register corresponding to an interrupt of priority level $k$, where $k \leq n$, both $k$ and $n$ being integers, $n$ being not less than 2, said registers including a first register and a second register and a third register, each register bit being driven between set and reset states;

first means for setting bits in said first register which correspond to the priority levels of received interrupt requests;

second means for transferring the states of the bits of said first register to the corresponding bits of said second register;

third means coupled to said second and third registers for providing an interrupt request signal to said computer only when said second register contains a set bit whose order is higher than the order of the highest order set bit in said third register, said computer being responsive to said interrupt request signal for providing a control signal defining an interrupt acknowledge period; and fourth means responsive to said control signal for generating an address corresponding to the highest order set bit in said second register, for resetting the highest order set bit in said first register, and for setting a bit in said third register corresponding to the highest order set bit in said second register, whereby the highest order set bit in said third register represents the priority level of the interrupt request for which said computer is in the process of performing a sub-routine and any lower order set bit in said third register represents a partially executed sub-routine for an interrupt request of a priority level associated with the lower order set bit.

6. A priority interrupt system as described in claim 5 wherein said computer is responsive to said address for locating the top address of the sub-routine associated with the priority level corresponding to the highest order set bit in said second register, each sub-routine including at substantially the end thereof an instruction for controlling fifth means to reset the highest order set bit in said third register.

7. A priority interrupt system as described in claim 6 wherein in said computer means are included for storing at the top address of a sub-routine to be executed the top address at which the computer was interrupted and each sub-routine includes an instruction at the last address thereof to retrieve the address located at the sub-routine's top address.

8. A priority interrupt system as recited in claim 5 wherein said registers include a fourth register of n bits, and said fourth means include means for setting a bit in said fourth register which corresponds to the highest order set bit in said second register at the start of said interrupt acknowledge period, said fourth means further providing the address as a function of the bit set in said fourth register, said fourth means further including means for setting the bit in said third register corresponding to the bit set in said fourth register during said interrupt request period and for resetting the bit set in said fourth register at substantially the end of said period.

9. A priority interrupt system as described in claim 8 wherein said computer is responsive to said address for locating the top address of the sub-routine associated with the priority level corresponding to the highest order set bit in said second register, each sub-routine including at substantially the end thereof an instruction for controlling fifth means to reset the highest order set bit in said third register.

10. A priority interrupt system as described in claim 9 wherein in said computer means are included for storing at the top address of a sub-routine to be executed the top address at which the computer was interrupted and each sub-routine includes an instruction at the last address thereof to retrieve the address located at the sub-routine's top address.

* * * * *